United States Patent [19]
Chong et al.

[11] Patent Number: 5,754,605
[45] Date of Patent: May 19, 1998

[54] METHOD AND APPARATUS FOR SYNCHRONIZATION OF A COMMUNICATIONS UNIT

[75] Inventors: William Chee-Foon Chong, Surrey; Bruce H. Golford, Vancouver; Gordon Guowen Yang, Richmond, all of Canada

[73] Assignee: Motorola, Schaumburg, Ill.

[21] Appl. No.: 537,200

[22] Filed: Sep. 29, 1995

[51] Int. Cl.[6] .................................................. H04L 7/00
[52] U.S. Cl. .................................. 375/368; 370/514
[58] Field of Search .............................. 375/354, 364, 375/365, 366, 368; 370/503, 514

[56] References Cited

U.S. PATENT DOCUMENTS 5,321,521  6/1994  Nomizu .................... 375/368
5,511,099  4/1996  Ko et al. .................. 375/368
5,550,833  8/1996  Fujisawa ................... 375/368

Primary Examiner—Temesghen Ghebretinsae
Attorney, Agent, or Firm—J. Ray Wood

[57] ABSTRACT

The disclosed communication unit includes synchronization circuitry having a sync sequence match detector and a decode detector. Upon matching a received sync sequence or word with a known sync sequence, the sync word (or, e.g., the block containing the received sync sequence) is decoded to determine whether the block is correctable (or more generally, whether the signal quality is above a threshold). When a match is found and the sequence/block is correctable, an appropriate sync indication is outputted. Additional information, such as color code matching of consecutive sync words, may also be used before determining synchronization has been achieved.

15 Claims, 3 Drawing Sheets

5,754,605

1

METHOD AND APPARATUS FOR SYNCHRONIZATION OF A COMMUNICATIONS UNIT

FIELD OF THE INVENTION

The present invention relates to communications and more particularly an improved method and apparatus for synchronization by a communications unit.

BACKGROUND

In order to optimally decode digital communications, some form of synchronization by a receiver to the received signal is required. Most wireless communications systems, such as the GSM (Global System for Mobiles) cellular service, include a known sequence as a preamble or mid-amble in transmissions. The longer such a unique sequence is, the greater the probability will be that the receiving unit will correctly acquire and decode the data being communicated.

However, the use of a preamble or mid-amble is not always available. In the case of the CDPD (Cellular Digital Packet Data) service, the forward channel or down link (i.e., from a base station to a mobile unit or subscriber) is structured in repeating 420 bit blocks (100 in FIG. 1) each having 378 FEC (forward error correction) encoded data bits interleaved by 7 6-bit control and synchronization flags (101–107), as illustrated by FIG. 1. Each 6-bit group (101–107) of control and synchronization flags include one decode status flag (121–127) and 5 synchronization bits (111–117) XORed (exclusive-ored) by a 5 bit busy/idle flag (e.g., all 1's or 0's). The 5×7=35 synchronization bits in each block form a single synchronization word (130).

The CDPD structure was chosen for its advantages in providing, upon correct synchronization, FEC block boundaries, reverse channel status flags and DSMA/CD (digital sense multiple access/collision detection) microslot timing, and the like of packet data subscribers. However, the process of matching to find the 35 bit synchronization word can yield an unacceptably high level of false sync detection. This is a particular problem in systems like CDPD, where data channels are provided by borrowing unused voice channels, because a subscriber could interpret a false sync detection as an invitation to transmit, and such a transmission could significantly interfere with any voice traffic in progress on the corresponding reverse channel.

There remains therefore a need for an improved means for synchronization in communications systems that solves these and related problems.

BRIEF DESCRIPTION OF THE DRAWINGS

These problems and others are solved by the improved method and apparatus according to the invention, of which one illustrative embodiment is described below in connection with the following drawings.

DETAILED DESCRIPTION

One illustrative embodiment of the invention, presently preferred in connection with use in CDPD service, is a

2 communication unit functioning to acquire a signal only after performing a sync match and a signal quality determination. In particular, in this preferred embodiment a sync match is first performed on a received block, then the block is decoded to determine whether it is error correctable. If correctable, synchronization is achieved and tracking commenced. Also, additional steps can be included, such as determining color code matches and requiring at least two consecutive correctable blocks. By employing the invention, either with or without such additional steps, one can thus effectively reduce the likelihood of any false sync while still providing for an efficient synchronization process.

Figure 1:
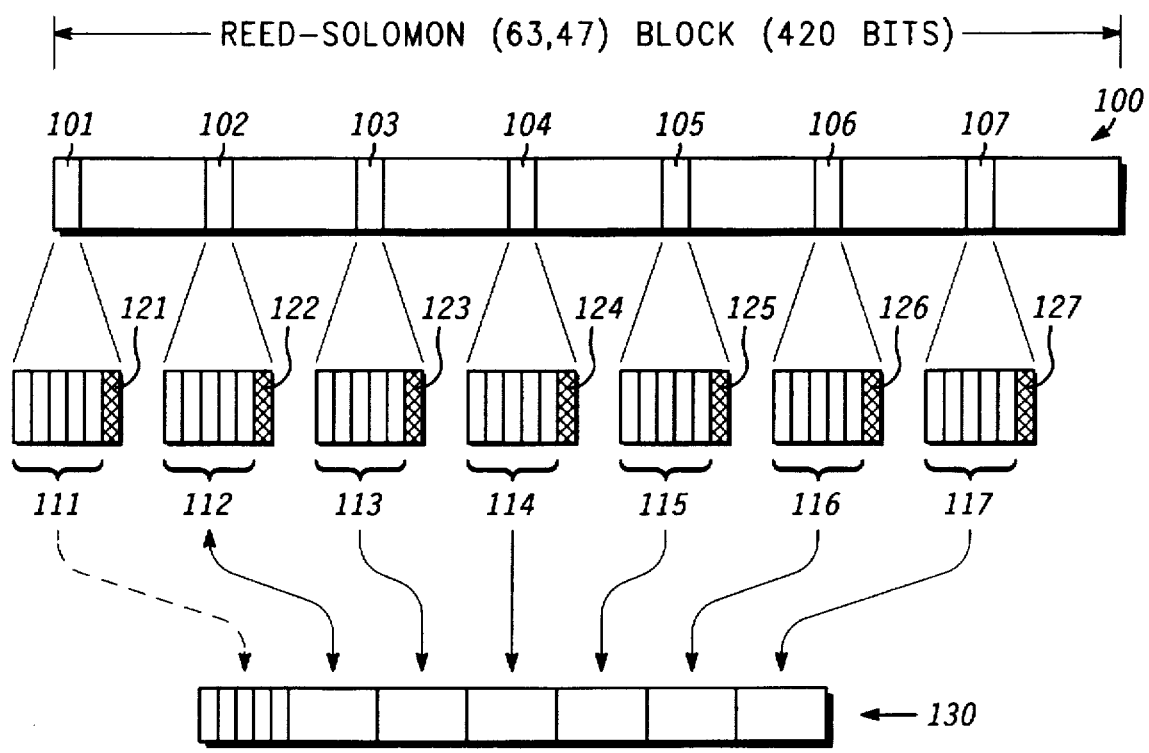
FIG. 1 is a diagram of a forward channel structure for use with a first embodiment of the invention.
Figure 2:
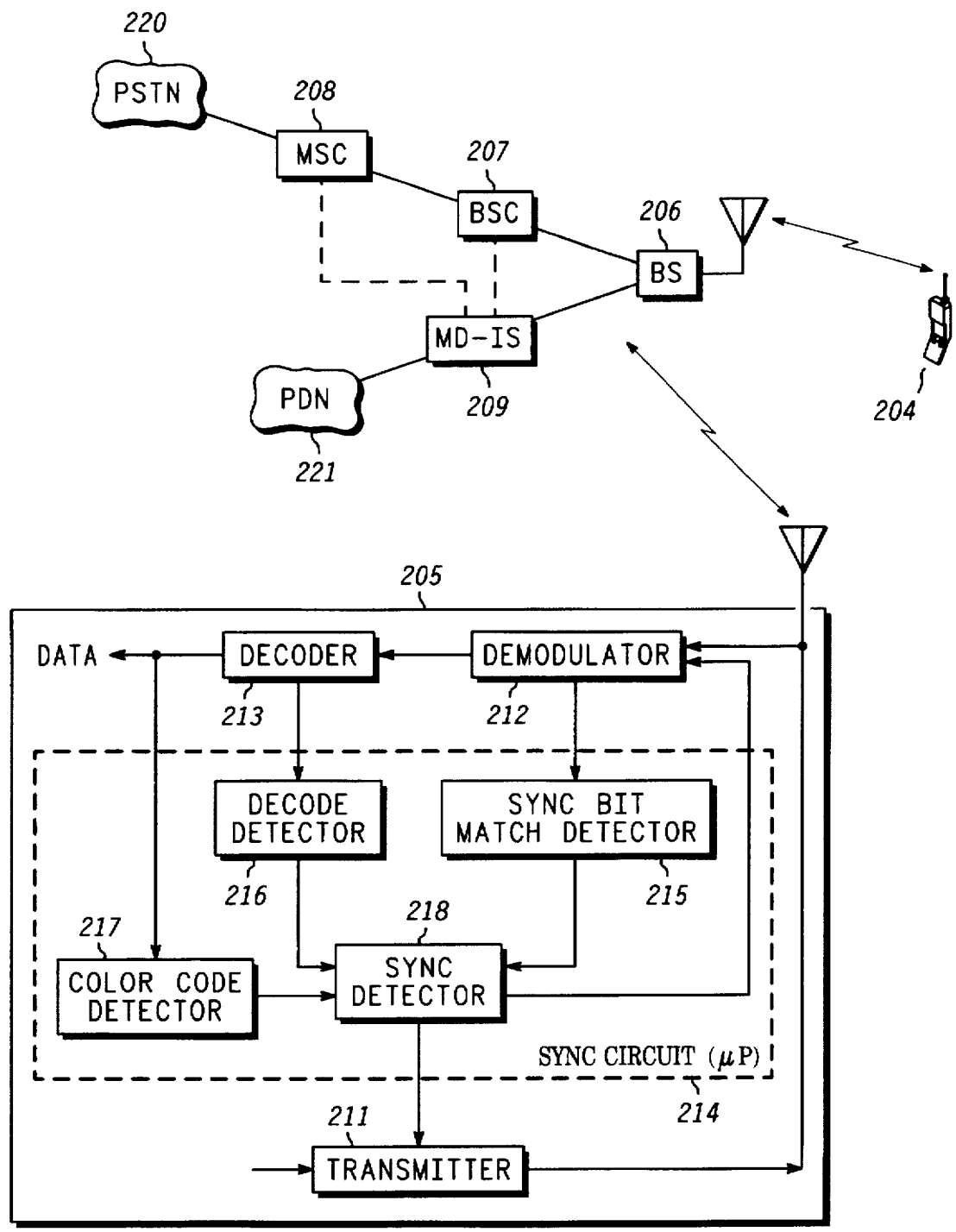
FIG. 2 is a block diagram of a wireless communications system according to the first embodiment of the invention.

Turning now to FIG. 2, there is generally depicted a wireless communications system 200 having one or more subscriber units (i.e., mobile station (MS) 204 and 205) communicating via a base station (BS) 206 and base station controller (BSC) 207. The subscriber unit may be of such diverse types as dedicated data units (e.g., personal digital assistants (PDAs)), radiotelephones, both voice-only and those adapted for coupling with data terminals (e.g., portable computers), or wireless adapter devices (e.g., wireless modems adapted for coupling with computers, message pads, etc.), and the like. In any event, the subscriber unit 206 illustrated includes a transmitter circuitry 211 and receiver circuitry including a demodulator 212, decoder 213 and sync circuit 214. The sync circuit preferably includes a sync bit match detector 215, decode detector 216, color code detector 217, and sync detector 218. One skilled in the art will appreciate that the sync circuit may be readily implemented as either discrete components, integrated circuitry such as an ASIC (application specific integrated circuit), or appropriately configured and programmed processors such as a DSP (digital signal processor). Further, it should be recognized that while the illustrated embodiment concerns a particular approach to communicating data over a cellular system, i.e., CDPD, the invention has much broader application to any other communication system requiring synchronization, including GSM (Global System for Mobiles), CDMA (code division multiple access), and dedicated data systems like ARDIS or RAM.

Finally, the illustrated system includes further infrastructure equipment such as a BSC 207 (base site controller), MSC 208 (mobile switching center) and MD-IS 209 (mobile data intermediate system). The MSC is connected to a public switched telephone network (PSTN) 220, and may also be connected to MD-IS 209 via a modem bank or the like for communication (e.g., via a hybrid circuit-switched system) to the packet switched public data network (PDN) 221.

Figure 3:
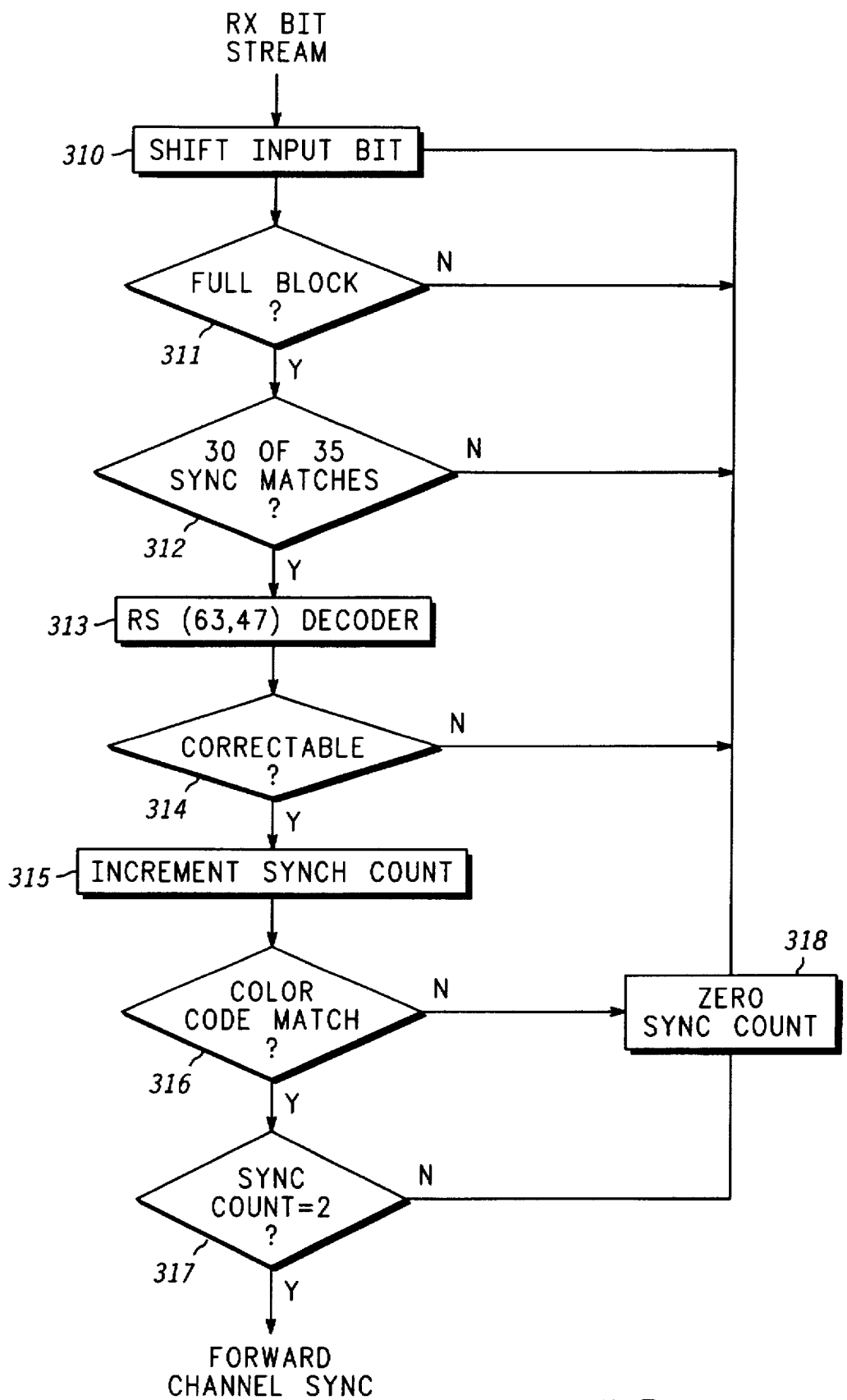
FIG. 3 is a flow chart illustrating presently preferred steps used in signal acquisition with the system of FIG. 2.

The operation of this system can be further understood by additional reference now to the flow chart of FIG. 3. A received signal bit stream is preferably input, e.g. to a register or buffer holding at least a full 420 bit CDPD block (steps 310, 311). Thus, in the illustrated process a bitstream is input until the buffer is full, or if already full but not yet successfully decoded new bits are successively input until successful decoding.

Once a full block, or newly shifted block, is received, a match is performed, e.g., by sync match detector 215, with one of the known sync sequences. For CDPD, e.g., the 35 bit sync word is extracted from the 420 bit block and compared against one of the two allowed sequences (i.e., formed from the one allowed sync sequence exclusive-ored by the two allowed busy/idle bit patterns of 1's or 0's). Because up to 5 bits in error in the sync sequence can be tolerated, this step preferably looks for a match of at least 30 of the bits in the sync word (step 312).

However, as noted above, performing just this step of matching has been found to be less than satisfactory, because it can lead to too high of a rate of false synchronization. Thus, the present embodiment further includes the step of determining whether or not the matched sequence is also error correctable, or in other words, has a signal quality above a set threshold. In the case of CDPD, this preferably includes decoding the 420 bit block determined to have a matched sync word, and determining whether the block is correctable (steps 313, 314). If the block was successfully error-corrected, then sync is established. If not, the process returns to step 310 and the buffer input is shifted and steps 311 through 314 repeated.

Alternately, in order to further improve the synchronization process, additional steps are also preferably performed in a device such as that of FIG. 2. Thus, in the illustrated approach a color code detector 217 is used to determine the color code included in the received block, the color code identifying the transmitting base station 206. Additionally, a counter determines how many blocks have been successfully decoded. Once two consecutive blocks are successfully decoded and have matching color codes, a sync signal is generated and appropriate timing/tracking circuitry adjusted based on the acquired synchronization. On the other hand, if the color codes do not match, indicating that the decoded signals were transmitted from different base stations, the sync process is started over again (steps 315–318). Thus, by looking for at least two consecutive successfully decoded blocks and/or additional information from the blocks indicative of a common signal or transmitting unit (such as the color codes), a more robust sync process is achieved. One skilled in the art will appreciate that other information from consecutively decoded bit groups (e.g., blocks, frames, etc.) may also be used, including other identifiers, header information, distinct repeating data, or even distinct coding or timing offsets, in determining whether synchronization has been acquired.

While the invention has been described in conjunction with specific embodiments thereof, it is evident that many alterations, modifications, and variations will be apparent to those skilled in the art in light of the foregoing description. For example, while processor 214 and other circuits, are described in terms of specific logical/functional circuitry relationships, one skilled in the art will appreciate that such may be implemented in a variety of ways, such as appropriately configured and programmed processors, ASICs, and DSPs. Further, the invention is not limited to the illustrated cellular system and block structure, but has applicability to any communications unit, whether infrastructure, subscriber or other, requiring synchronization. Thus, it should be understood that the invention is not limited by the foregoing description of preferred embodiments, but embraces all such alterations, modifications, and variations in accordance with the spirit and scope of the appended claims.

We claim:

1. A communication unit including a receiver operable to receive a signal from a transmitting unit, the communication unit comprising:

a demodulator operable to demodulate the signal; and a synchronization unit, coupled to the demodulator, comprising:

a sync word detector operable to detect a sync word in a first block of the signal and output a sync word indication;

a decode status detector operable to determine when the first block is error correctable and output a decode status indication;

a sync detector coupled to the sync word detector and decode status detector operable to determine when the signal is synchronized to, based on the sync word indication and the decode status indication.

2. The communication unit of claim 1, wherein the synchronization unit further comprises:

a block information detector, coupled to the sync detector, operable to detect a first information value from the first block and a further information value from a second block and determine based on the first and second block when the first block and second block are both from the transmitting unit.

3. The communication unit of claim 2, wherein the block information detector is a color code detector operable to detect a first color code value from the first block and a further color code value from the second block, the second block being adjacent to the first block, and when the first and second color code values match to output a color code match indication, the sync detector being further operable to determine when the signal is synchronized to, based on the sync word indication, the decode status indication and the color code match indication.

4. A communication unit including a receiver operable for receiving a signal from a transmitting unit, the communication unit comprising:

a demodulator operable for demodulating a received bitstream; and a synchronization means, coupled to the demodulator, for determining when there is synchronization to the received bitstream, by both detecting when a sync sequence is present in a first group of bits of the received bitstream and determining when the first group of bits can be decoded, wherein the synchronization means is further operable for determining when the first group of bits can be decoded by determining whether the first group of bits are error correctable.

5. A communication unit including a receiver operable for receiving a signal from a transmitting unit, the communication unit comprising:

a demodulator operable for demodulating a received bitstream; and a synchronization means, coupled to the demodulator, for determining when there is synchronization to the received bitstream, by both detecting when a sync sequence is present in a first group of bits of the received bitstream and determining when the first group of bits can be decoded, wherein the first group of bits is a first block and the synchronization means is further operable for determining when the first block is error correctable by decoding the first block and determining that the first block has no uncorrectable errors.

6. A communication unit including a receiver operable for receiving a signal from a transmitting unit, the communication unit comprising:

a demodulator operable for demodulating a received bitstream; and a synchronization means, coupled to the demodulator, for determining when there is synchronization to the received bitstream, by both detecting when a sync sequence is present in a first group of bits of the received bitstream and determining when the first group of bits can be decoded, wherein the first group of bits is a first block, and the synchronization means is further operable for detecting when the sync sequence is present by matching a first bit sequence occupying a sync field of the first block against a predetermined sync word.

7. A communication unit including a receiver operable for receiving a signal from a transmitting unit, the communication unit comprising:

a demodulator operable for demodulating a received bitstream; and a synchronization means, coupled to the demodulator, for determining when there is synchronization to the received bitstream, by both detecting when a sync sequence is present in a first group of bits of the received bitstream and determining when the first group of bits can be decoded, wherein the synchronization means is further operable for detecting a first information value from the first group of bits, and for detecting when the sync sequence is present in a second group of bits of the received bitstream following the first group of bits, determining when the second group of bits can be decoded, and detecting a second information value from the second group of bits, and wherein the synchronization means is further operable for making a determination that the received bitstream is synchronized to when the first and second information values are indicative of the first and second groups of bits being from a common source, the first and second group of bits can be decoded, and the sync sequence is detected in both first and second group of bits.

8. The communication unit of claim 7, wherein the first and second information values are first and second color code values, the synchronization means being further operable for making the determination that the received bitstream is synchronized to when the first and second color code values are the same.

9. A method of receiving a signal by a receiver comprising:

(a) demodulating a received bitstream;

(b) detecting whether a sync sequence is present in a first group of bits of the received bitstream;

(c) determining whether the first group of bits can be decoded and whether the first group of bits are error correctable; and (d) synchronizing the receiver to the received bitstream when the sync sequence is detected in the first group of bits and the first group of bits are decodable.

10. The method of claim 9; wherein the first group of bits is a first block, and step (c) comprises determining whether the first block is error correctable by decoding the first block and determining whether the first block has no uncorrectable errors.

11. The method of claim 9, wherein the first group of bits is a first block, and step (b) comprises detecting whether the sync sequence is present by matching a first bit sequence occupying a sync field of the first block against a known CDPD (cellular digital packet data) sync word.

12. A method of receiving a signal by a receiver comprising:

(a) demodulating a received bitstream;

(b) detecting whether a sync sequence is present in a first group of bits of the received bitstream;

(c) determining whether the first group of bits can be decoded; and (d) synchronizing the receiver to the received bitstream when the sync sequence is detected in the first group of bits and the first group of bits are decodable, wherein step (d) further comprises repeating steps (a) through (c) for a second group of bits of the received bitstream when the sync sequence is not detected in the first group of bits.

13. A method of receiving a signal by a receiver comprising:

(a) demodulating a received bitstream;

(b) detecting whether a sync sequence is present in a first group of bits of the received bitstream;

(c) determining whether the first group of bits can be decoded; and (d) synchronizing the receiver to the received bitstream when the sync sequence is detected in the first group of bits and the first group of bits are decodable, wherein step (d) further comprises repeating steps (a) through (c) for a second group of bits of the received bitstream when the first group of bits are not decodable.

14. A method of receiving a signal by a receiver comprising:

(a) demodulating a received bitstream;

(b) detecting whether a sync sequence is present in a first group of bits of the received bitstream;

(c) determining whether the first group of bits can be decoded;

(d) detecting a first information value from the first group of bits;

(e) detecting whether the sync sequence is present in a second group of bits of the received bitstream following the first group of bits;

(f) determining whether the second group of bits can be decoded;

(g) detecting a second information value from the second group of bits; and (h) synchronizing the receiver to the received bitstream when the sync sequence is detected in the first group of bits and the first group of bits are decodable, wherein step (h) further comprises synchronizing the receiver to the received bitstream when the first and second information values are indicative of the first and second groups of bits being from a common source, the first and second group of bits are decodable, and the sync sequence is detected in both the first and second group of bits.

15. The method of claim 14, wherein the first and second information values are first and second color code values, and step (h) further comprises synchronizing the receiver to the received bitstream when the first and second color code values are the same.

* * * * *